(12) United States Patent
Ohk et al.

(10) Patent No.: US 8,798,396 B2
(45) Date of Patent: Aug. 5, 2014

(54) APPARATUS AND METHOD OF SEGMENTING AN IMAGE IN AN IMAGE CODING AND/OR DECODING SYSTEM

(75) Inventors: Hyung-Soo Ohk, Seoul (KR); Jonghyon Yi, Yongin-si (KR); Charles A. Bouman, West Lafayette, IN (US); Eri Haneda, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 13/570,813

(22) Filed: Aug. 9, 2012

(65) Prior Publication Data

US 2012/0300227 A1 Nov. 29, 2012

Related U.S. Application Data

(63) Continuation of application No. 11/626,588, filed on Jan. 24, 2007, now Pat. No. 8,254,680.

(51) Int. Cl.
*G06K 9/32* (2006.01)

(52) U.S. Cl.
USPC ........... 382/299; 358/2.1; 358/3.26; 382/164; 382/166; 382/173; 382/176; 382/260

(58) Field of Classification Search
None
See application file for complete search history.

(56) References Cited

U.S. PATENT DOCUMENTS

| | | | |
|---|---|---|---|
| 4,437,122 A | 3/1984 | Walsh et al. | |
| 5,778,092 A * | 7/1998 | MacLeod et al. | 382/176 |
| 6,327,050 B1 | 12/2001 | Motamed et al. | |
| 6,731,800 B1 * | 5/2004 | Barthel et al. | 382/176 |
| 6,941,011 B2 * | 9/2005 | Roylance et al. | 382/164 |
| 7,031,518 B2 | 4/2006 | Curry et al. | |
| 7,120,297 B2 * | 10/2006 | Simard et al. | 382/166 |
| 7,206,101 B2 * | 4/2007 | Avinash | 358/3.26 |
| 2002/0085248 A1 | 7/2002 | Xu et al. | |
| 2003/0095714 A1 * | 5/2003 | Avinash | 382/260 |
| 2003/0179409 A1 * | 9/2003 | Nishida | 358/2.1 |
| 2004/0001622 A1 * | 1/2004 | Roylance et al. | 382/166 |
| 2004/0001624 A1 | 1/2004 | Curry et al. | |
| 2004/0001625 A1 * | 1/2004 | Curry et al. | 382/173 |

FOREIGN PATENT DOCUMENTS

| | | |
|---|---|---|
| EP | 1349371 | 10/2003 |
| JP | 5-75852 | 3/1993 |
| JP | 8-153199 | 6/1996 |
| JP | 9-200521 | 7/1997 |
| JP | 2004-304404 | 10/2004 |
| KR | 10-2000-0037704 | 7/2000 |

OTHER PUBLICATIONS

United States Office Action dated May 24, 2010 issued in U.S. Appl. No. 11/626,588.

(Continued)

*Primary Examiner* — Tsung-Yin Tsai (74) *Attorney, Agent, or Firm* — Stanzione & Kim, LLP (57) ABSTRACT

An apparatus usable in an image encoding and/or decoding system includes a segmentation unit to convert a first image of a first resolution into a second image of a second resolution, to segment the second image of the second resolution with one or more blocks of a binary mask layer having a foreground and a background, and to convert the segmented second image into a third image of a third resolution as a segmented image.

26 Claims, 6 Drawing Sheets

(56) References Cited

OTHER PUBLICATIONS

United States Final Office Action dated Dec. 9, 2010 issued in U.S. Appl. No. 11/626,588.
United States Office Action dated Apr. 15, 2011 issued in U.S. Appl. No. 11/626,588.
United States Final Office Action dated Sep. 8, 2011 issued in U.S. Appl. No. 11/626,588.
European Search Report dated May 15, 2008 issued in EP 08150516.6.
Barry G. Haskell, Paul G. Howard, Yann A. LeCun, Atul Puri, Joern Ostermann, M. Reha Civanlar, Lawrence Rabiner, Leon Bottou and Patrick Haffner—XP011014517—"Image and Video Coding-Emerging Standards and Beyond".
Korean Office Action issued Apr. 21, 2011 in KR Application No. 10-2007-0025730.
Chinese Office Action mailed Jul. 22, 2011 in Chinese Patent Application No. 200810003979.2.
EP Summons to Oral Proceedings issued Dec. 18, 2009 in EP Application No. 08150516.6.
KR Office Action issued Nov. 24, 2011 in KR Application No. 10-2007-0025730.

* cited by examiner

300 dpi segmentation

100 dpi segmentation

Jazzy new signs in subway stations have been catching the eyes of commuters in Washington. Instead Segmentation at 100 dpi before refinement Jazzy new signs in subway stations have been catching the eyes of commuters in Washington. Instead Segmentation at 300 dpi after refinement

FIG. 6

Original image

Initial segmentation results

Multirate segmentation results

APPARATUS AND METHOD OF SEGMENTING AN IMAGE IN AN IMAGE CODING AND/OR DECODING SYSTEM

CROSS-REFERENCE TO RELATED APPLICATIONS

This application is a continuation application of prior application Ser. No. 11/626,588, filed Jan. 24, 2007 in the U.S. Patent and Trademark Office.

BACKGROUND OF THE INVENTION

1. Field of the Invention

The present invention relates to an apparatus and method of segmenting an image and/or receiving the segmented image in an image coding and/or decoding system, and more particularly, to an apparatus and method of adjust a resolution of an image to a second resolution, to segment the image of the second resolution, and to generate a segmentation image according to the segmented image and the image of the first resolution in a mixed raster content based coding and/or decoding system.

2. Description of the Related Art

Mixed Raster Content (MRC), defined in ITU-T T.44, is a standard for efficient document compression which can dramatically improve the compression/quality tradeoff as compared to traditional lossy image compression algorithms. MRC represents an image as a set of layers. In the most basic mode of MRC, a compound document with text and pictures is separated into three layers: a binary mask layer, a foreground layer and a background layer. The binary mask layer indicates the assignment of foreground as "1", or background as "0" to each pixel. According to ITU-T T.44, it is recommended that text and line art be classified to the foreground layer, and pictures classified to the background.

MRC encoding includes a process of segmentation to differentiate text and graphics regions within an image and creates the binary mask layer described above. Typically, the foreground layer contains the colors of text, the background layer contains images and graphics, and the binary mask layer is used to represent the fine detail of text fonts. The quality of decoded image is heavily dependent on the segmentation algorithm because binary mask defines the shape of characters, and because incorrect segmentation can cause distortion in the decoded image.

Although segmentation is a critical step in MRC encoding, the standard ITU-T T. 44 does not define the segmentation method. The standard defines only the structure of MRC document decoder, so the segmentation algorithm may be independently optimized for best performance.

In general, the computation time of segmentation is highly dependent on the number of pixels in the input image. Especially when high resolution images are processed, it is most often necessary to consider computation time improvements.

SUMMARY OF THE INVENTION

The present general inventive concept provides an apparatus and method of segmenting an image and adjusting a resolution of the segmented image in an image coding and decoding system.

The present general inventive concept also provides an apparatus and method of segmenting an image and/or adjusting a resolution of the segmented image in a mixed raster content based coding and decoding system.

The present general inventive concept also provides an apparatus and method of reducing a computation time taken to segment the image in an image coding and decoding system.

Additional aspects and/or advantages of the present general inventive concept will be set forth in part in the description which follows and, in part, will be obvious from the description, or may be learned by practice of the present general inventive concept.

The foregoing and/or other aspects of the present general inventive concept may be achieved by providing an apparatus usable in an image encoding and decoding system, the apparatus including a segmentation unit to convert a first image of a first resolution into a second image of a second resolution, to segment the second image of the second resolution with one or more blocks of a binary mask layer having a foreground and a background, and to convert the segmented second image into a third image of a third resolution as a segmented image.

The first resolution may be the same as the third resolution.

Wherein the second resolution may be lower than at least one of the first resolution and the third resolution.

The segmentation unit may convert the segmented second image into the third image of the third resolution using the first image of the first resolution.

The segmentation unit may interpolate the segmented second image with the first image of the first resolution to output the third image of the third resolution as the segmented image.

The segmentation unit may refine an edge of the second image of the second resolution with the first image of the first resolution to have the third resolution.

The segmentation unit may refine a boundary block between the foreground land the background using the first image of the first resolution to generate the third image of the third resolution as the segmented image.

The segmentation unit may divide the second image into the one or more blocks, define the one or more blocks of the second image into the foreground and the background, and adjust the second resolution of the one or more blocks of the second image to the third resolution using the first image of the first resolution.

The one or more blocks of the second image may include a plurality of pixels representing the second resolution, and the one of more blocks of the third image comprises a plurality of second pixels representing the third resolution.

The one or more blocks of the second image may include a first number of pixels representing the second resolution, and the one of more blocks of the third image comprises a second number of pixels representing the third resolution.

The segmentation unit may convert the segmented second image into the third image of the third resolution using the first image of the first resolution to output the segmented image of the third resolution.

The segmented second image may include one or more blocks of a binary mask layer having a foreground and a background, and the segmentation unit mar refine edges blocks among the one or more blocks of the segmented second image using the first image of the first resolution to output the segmented image.

The segmentation unit may comprise a sub-sampling and decimating unit to sub-sample and/or decimate the first image of the first resolution into the second image of the second resolution, a segment unit to segment the second image by dividing the second image into one or more blocks of the second resolution as a binary mask layer of a foreground and a background, and an interpolating and refining unit to convert the segmented second image into the third image of the third resolution.

The segmentation unit may comprise a sub-sampling unit to sub-sample the first image of the first resolution into the second image of the second resolution, a segment unit to segment the second image by dividing the second image into one or more blocks of the second resolution as a binary mask layer of a foreground and a background, and an interpolating to interpolate the segmented second image and the first image to generate the third image of the third resolution.

The segmentation unit may comprise a decimating unit to decimate the first image of the first resolution into the second image of the second resolution, a segment unit to segment the second image by dividing the second image into one or more blocks of the second resolution as a binary mask layer of a foreground and a background, and an interpolating to interpolate the segmented second image and the first image to generate the third image of the third resolution.

The segmentation unit may comprise a sub-sampling unit to sub-sample and/or decimate the first image of the first resolution into the second image of the second resolution, a segment unit to segment the second image by dividing the second image into one or more blocks of the second resolution as a binary mask layer of a foreground and a background, and a refining unit to refine an edge of the second image to generate the third image of the third resolution.

The segmentation unit may comprise a sub-sampling and decimating unit to reduce the first resolution of the first image to generate the second image of the second resolution, a second unit to segment the second image by dividing the second image into one or more blocks of the second resolution as a binary mask layer of a foreground and a background, and an interpolating and refining unit to increase the second resolution of the blocks of the second image to generate the third image of the third resolution.

The apparatus may further comprise a scanner to scan a document to generate the first image as an input image signal.

The apparatus may further comprise an encoding unit to encode the segmented image as an output image signal.

The apparatus may further comprise a decoding unit to decode the output image signal as a print image signal.

The apparatus may further comprise a printing unit to print the print image signal on a printing medium.

The foregoing and/or other aspects of the present general inventive concept may also be achieved by providing an apparatus usable in an image encoding and decoding system, the apparatus including a segmentation unit to reduce a first resolution of a first image into a second resolution as a second image, to segment the second image of the second resolution with one or more blocks of a binary mask layer having a foreground and a background, and to increase the second resolution of the segmented second image to a third resolution as a third image to output a segmented image.

The foregoing and/or other aspects of the present general inventive concept may also be achieved by providing an apparatus usable in an image encoding and decoding system, the apparatus including a segmentation unit to convert a first image of a first resolution into a second image of a second resolution, to segment the second image of the second resolution with one or more blocks of a binary mask layer having a foreground and a background, and to convert the segmented second image into a third image of a third resolution as a segmented image.

The foregoing and/or other aspects of the present general inventive concept may also be achieved by providing an apparatus usable in an image encoding and decoding system, the apparatus including an encoding unit to encode the segmented image as an output image signal, a decoding unit to decode the output image signal as a print image signal, and a printing unit to print the print image signal on a printing medium.

The foregoing and/or other aspects of the present general inventive concept may also be achieved by providing an apparatus usable in an image encoding and decoding system, the apparatus including a segmentation unit to reduce a first resolution of an image into a second resolution, to segment the image of the second resolution, and to increase the second resolution of the segmented image to a third resolution to output a segmented image.

The foregoing and/or other aspects of the present general inventive concept may also be achieved by providing an image encoding and/or decoding system, including a segmentation unit to segment an image of a resolution, and to adjust the resolution of the segmented image to another resolution as a segmented image.

The foregoing and/or other aspects of the present general inventive concept may also be achieved by providing a method of an image encoding and/or decoding system, the method including reducing a first resolution of an image into a second resolution, segmenting the image of the second resolution, and increasing the second resolution of the segmented image to a third resolution to output a segmented image.

The foregoing and/or other aspects of the present general inventive concept may also be achieved by providing a method of an image encoding and decoding system, the method including converting a first image of a first resolution into a second image of a second resolution, segmenting the second image of the second resolution, and converting the segmented second image into a third image of a third resolution as a segmented image.

The foregoing and/or other aspects of the present general inventive concept may also be achieved by providing a method of an image encoding and decoding system, the method including reducing a first resolution of a first image into a second resolution as a second image, segmenting the second image of the second resolution with one or more blocks of a binary mask layer having a foreground and a background, and increasing the second resolution of the segmented second image to a third resolution as a third image to output a segmented image.

The foregoing and/or other aspects of the present general inventive concept may also be achieved by providing a method of an image encoding and decoding system, the method including converting a first image of a first resolution into a second image of a second resolution, segmenting the second image of the second resolution with one or more blocks of a binary mask layer having a foreground and a background, converting the segmented second image into a third image of a third resolution as a segmented image, encoding the segmented image as an output image signal, decoding the output image signal as a print image signal, and printing the print image signal on a printing medium.

The foregoing and/or other aspects of the present general inventive concept may also be achieved by providing a computer readable recording medium containing computer readable codes as a program to execute a method of an image encoding and decoding system, the method including converting a first image of a first resolution into a second image of a second resolution, segmenting the second image of the second resolution, and converting the segmented second image into a third image of a third resolution as a segmented image.

The foregoing and/or other aspects of the present general inventive concept may also be achieved by providing a computer readable recording medium containing computer readable codes as a program to execute a method of an image encoding and decoding system, the method including reducing a first resolution of a first image into a second resolution as a second image, segmenting the second image of the second resolution with one or more blocks of a binary mask layer having a foreground and a background, and increasing the second resolution of the segmented second image to a third resolution as a third image to output a segmented image.

The foregoing and/or other aspects of the present general inventive concept may also be achieved by providing a computer readable recording medium containing computer readable codes as a program to execute a method of an image encoding and decoding system, the method including converting a first image of a first resolution into a second image of a second resolution, segmenting the second image of the second resolution with one or more blocks of a binary mask layer having a foreground and a background, converting the segmented second image into a third image of a third resolution as a segmented image, encoding the segmented image as an output image signal, decoding the output image signal as a print image signal, and printing the print image signal on a printing medium.

BRIEF DESCRIPTION OF THE DRAWINGS

The above and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout.

The resolution of an input document directly influences a computation time of segmentation. According to the present general inventive concept, a multirate scheme to segment an image using a different resolution reduces the computation time by performing the segmentation at a lower resolution. After the segmentation is performed, an output of the segmentation is interpolated and refined using an original image to obtain a high resolution output.

Figure 1:
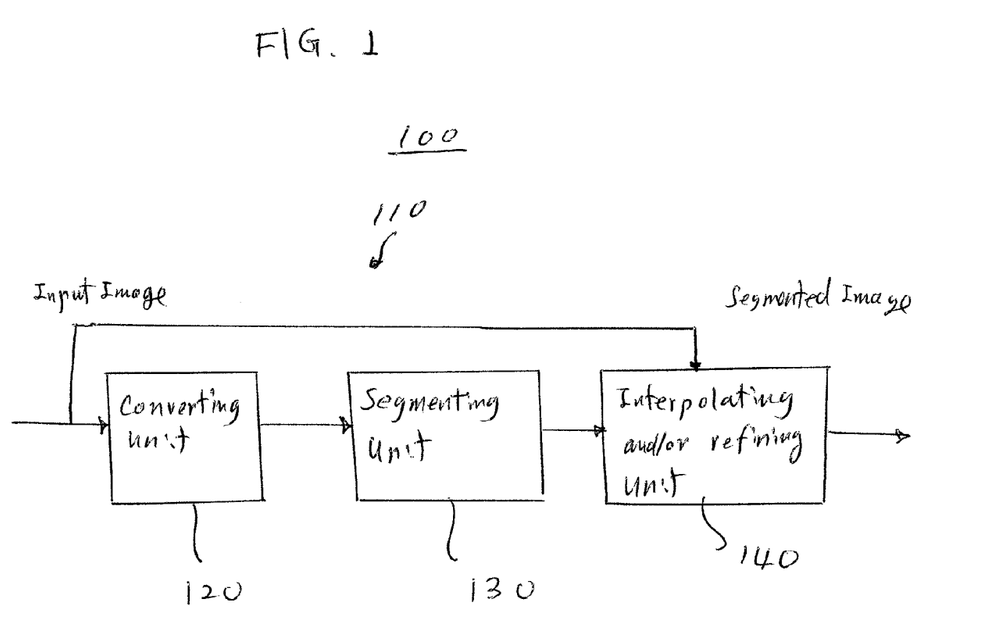
FIG. 1 is a view illustrating an encoding apparatus in an image coding and/or decoding system according to an embodiment of the present general inventive concept.

FIG. 1 is a view illustrating an image coding and/or decoding system 100 according to an embodiment of the present general inventive concept. Referring to FIG. 1, the image coding and/or decoding system includes an encoding apparatus 110 and a decoding apparatus (not illustrated). The encoding apparatus may include a scanning unit (not illustrated) to scan a document to generate an input signal (input image or image data) representing at least one of a text, a graphic, and an edge, a converting unit 120 to receive image data from the scanning unit or an external device and to convert a resolution of the image data to a second resolution, a segmenting unit 130 to segment the image data of the second resolution, and an interpolating and/or refining unit 140 to interpolate and/or refine the segmented image as a segmentation image to be encoded in an encoding unit (not illustrated) and to be output to the decoding apparatus through a transmitting unit and a line, such as a circuit, a wire network, and a wireless network (not illustrated).

The input signal may include a binary mask layer having one or more backgrounds and one or more foregrounds, a foreground layer representing the one or more foregrounds, and a background layer representing the one or more backgrounds. The binary mask layer may be transmitted to the encoding apparatus 110 as the input signal.

The segmenting unit 113 may include a divider (not illustrated). The divider may divide the input signal of the scanner or an external device into one or more blocks.

The converting unit 120 may include a converting unit 120 as a sub-sampling and/or decimating unit to sub-sample or decimate the input signal of the one or more blocks to reduce a resolution of the input signal. It is possible that the divider is connected between the converting unit 120 and the segmenting unit 130. In this case, the input signal is sub-sampled to reduce a resolution to a second resolution, and then the sub-sampled input image of the second resolution is divided into one or more blocks for segmentation. It is also possible that the divider divides the input signal into the one or more blocks, and the converting unit 120 reduces the resolution of the one or more blocks to the second resolution.

The segment unit 130 segments the blocks of the input signal (input image) of the second resolution and adjusts values of pixels of the respective blocks according to a predetermined manner to generate a first segmentation image. For example, the pixel values of the blocks may be adjusted to form a binary mask layer having one or more foregrounds and/or one or more backgrounds. The segmenting unit 113 may include a segmentation algorithm to perform the segmentation. It is possible that the segmentation unit 113 may perform a conventional segmentation algorithm.

The interpolating and/or refining unit 140 refines the first segmentation image as a second segmentation image using both the first segmentation image as a coarse resolution segmentation of the second resolution, and the second segmentation as an original high resolution input image of the resolution.

The converting unit 120 may selectively operate depending on a characteristic of the input image. That is, the input image is sub-sampled to reduce the computation time and the sub-sampled image is segmented. If the sub-sampling is not necessary according to the characteristic or simplicity of the input image, the input image is not sub-sampled. Thus, the segmentation unit 130 may perform the segmentation on one of the sub-sampled image or the non sub-sampled image. Either sub-sampling or decimation can be used to reduce a resolution of the input image.

A conventional method for MRC document segmentation processes a full resolution input image. However, according to the present embodiment, two different resolutions (two different rates) of the input image are used to obtain the segmentation. This multirate segmentation methodology can be used in a multi function printers (MFP), and provides advantages of reduced hardware cost or increased processing speed.

A computation time of the segmentation is highly dependent on the number of pixels in the input image. When the resolution of a scanned document is high, the total computation time for segmentation can be large. However, according to the present general inventive concept, this multirate segmentation algorithm reduces computation by reducing the resolution of the document to be segmented while substantially retaining the original segmentation quality by refining the final segmentation.

Figure 2:
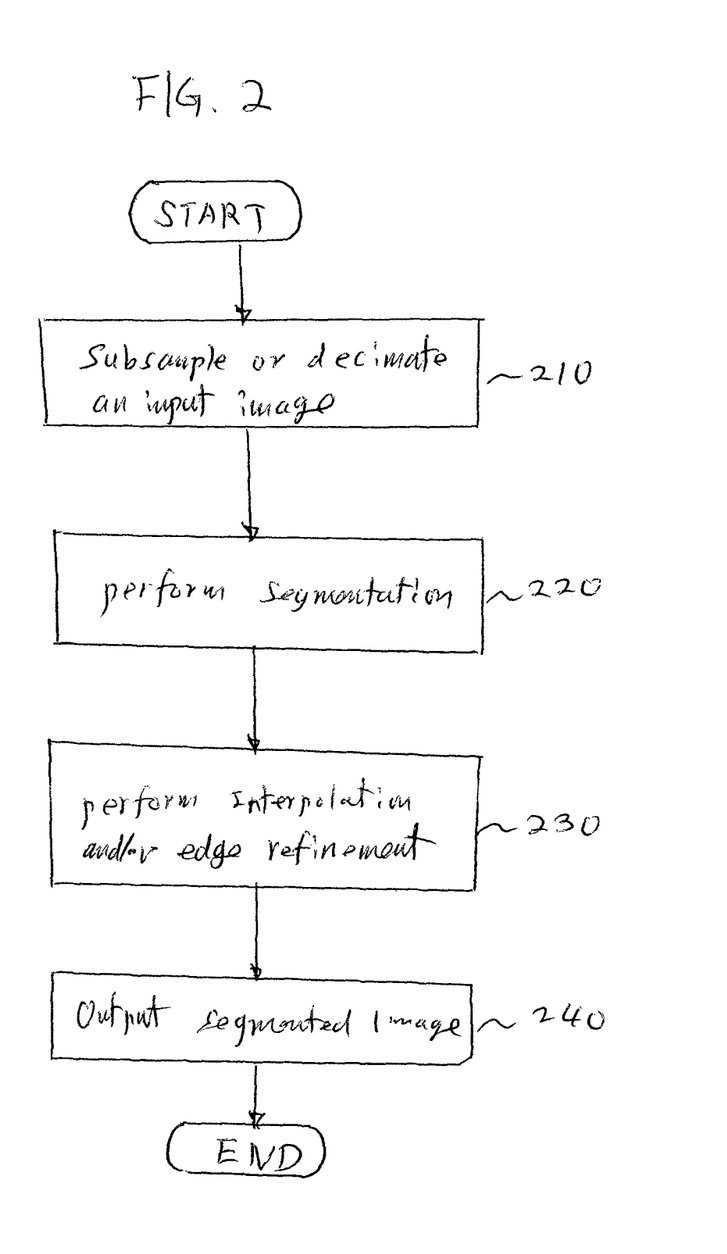
FIG. 2 is a flowchart illustrating a method of an image coding and/or decoding system according to an embodiment of the present general inventive concept

FIG. 2 is a flowchart illustrating a method of an image coding and/or decoding system according to an embodiment of the present general inventive concept. Referring to FIGS. 1 and 2, an input image is sub-sampled or decimated by a sub-sampling rate at operation 210. For example, if the input image is 300 dpi image and the sub-sampling rate is 3, the sub-sampled image becomes 100 dpi image. The segmentation is performed on the sub-sampled image of 100 dpi at operation 220. Since the segmentation is highly dependent on an image resolution, the computation time can be dramatically reduced. In this case, the computation time is reduced by approximately a factor of 9=3×3. The resulting 100 dpi segmentation is then interpolated back to 300 dpi and edge refinement is performed along boundaries of each connected component to obtain the final 300 dpi segmentation at operation 230. The edge refinement operation also uses the original 300 dpi image as another input to refine the edge of the first segmentation image at operation 230. The segmented image is output at operation 240. This multirate segmentation procedure results in substantially the same segmentation quality and much reduced computation time.

Figure 3:
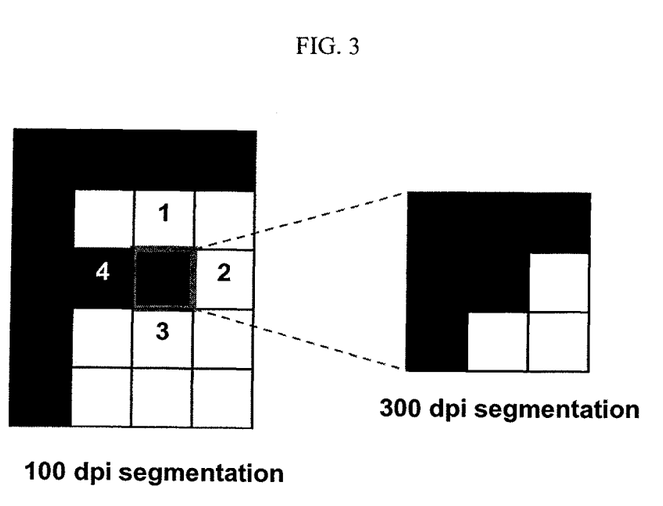
FIG. 3 is a view illustrating edges refined with different resolutions in an encoding apparatus of the image coding and/or decoding system of FIG. 1.

FIG. 3 is a view illustrating edges refined with different resolutions in an encoding apparatus of the image coding and/or decoding system of FIG. 1. The refined edges of FIG. 3 illustrate the edge refinement from 100 dpi to 300 dpi. Pixels at the boundaries between "0" and "1" at 100 dpi are refined. The refinements of both "0" and "1" pixels at the boundaries create better results. In this example, black regions represent foreground "1" and white region represent background "0." The black pixel surrounded by a red (solid and thick) line at 100 dpi is a current pixel which is being refined. The corresponding 3×3 pixels at 300 dpi are classified as 0 or 1 based on neighboring segmentation states and original image values as described below.

First, foreground reference color and background reference color are calculated to determine the threshold of 3×3 pixels to be classified as "0" or "1". The neighborhoods of the current pixel (4-neighboring pixels are used in this case) are divided into "0" group and "1" group at 100 dpi. The foreground reference color and background reference color are defined as the average of "1" pixels and the "0" pixels respectively. In this example, the foreground reference color is the color of pixel labeled as 4 while the background reference color is the average of pixels labeled as 1, 2 and 3.

Figure 4:
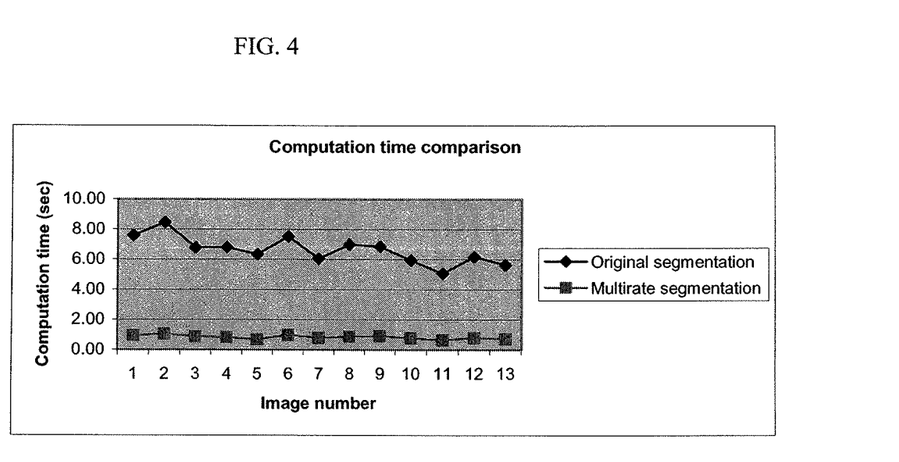
FIG. 4 is a view illustrating computation times of a conventional segmentation and the encoding apparatus of FIG. 1.

Second, the 3×3 pixels are segmented by comparing two distances to the foreground reference color and background reference color. For each of 3×3 pixels at 300 dpi, if the original pixel value is closer to the foreground reference color, the pixel is segmented as "1". Otherwise, the pixel is segmented as "0". This procedure may be repeated along the boundaries of all of the connected components FIG. 4 is a view illustrating computation times of a conventional segmentation and the encoding apparatus of FIG. 1. A resolution of documents usually ranges from 300 dpi to 600 dpi on average for a Letter size paper. The followings are the computation time results for 13 test images at 300 dpi. The input images were reduced to 100 dpi in the sub-sampling stage.

Figure 5:
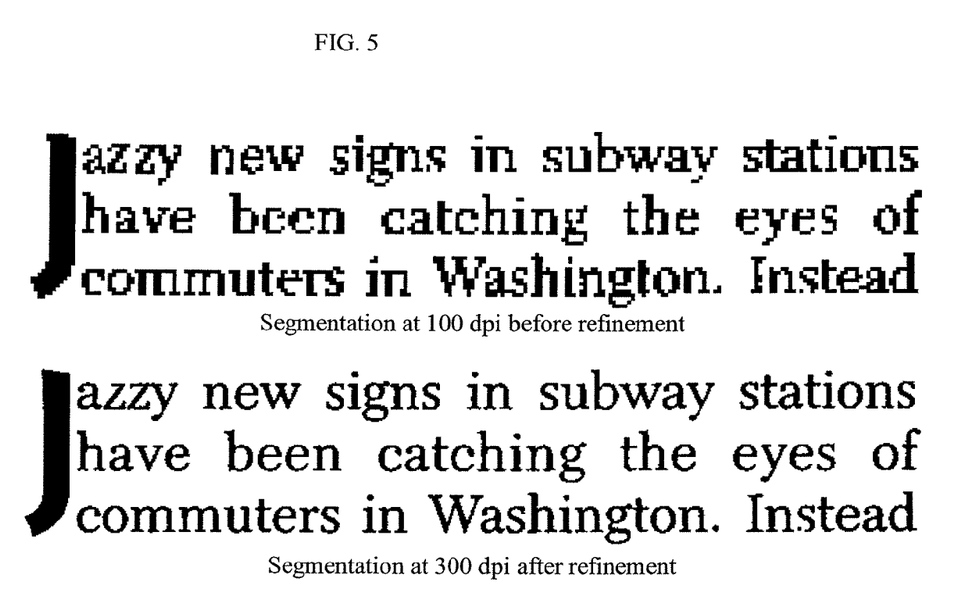
FIG. 5 is a view illustrating segmentation images with different resolutions before and after interpolation and/or refinement, respectively.

FIG. 5 is a view illustrating segmentation images with different resolutions before and after interpolation and/or refinement, respectively. The interpolation and refinement are performed after the segmentation, to obtain the original resolution from the reduced resolution. FIG. 5 illustrates an example of the segmentation interpolation and refinement along the boundaries.

Figure 6:
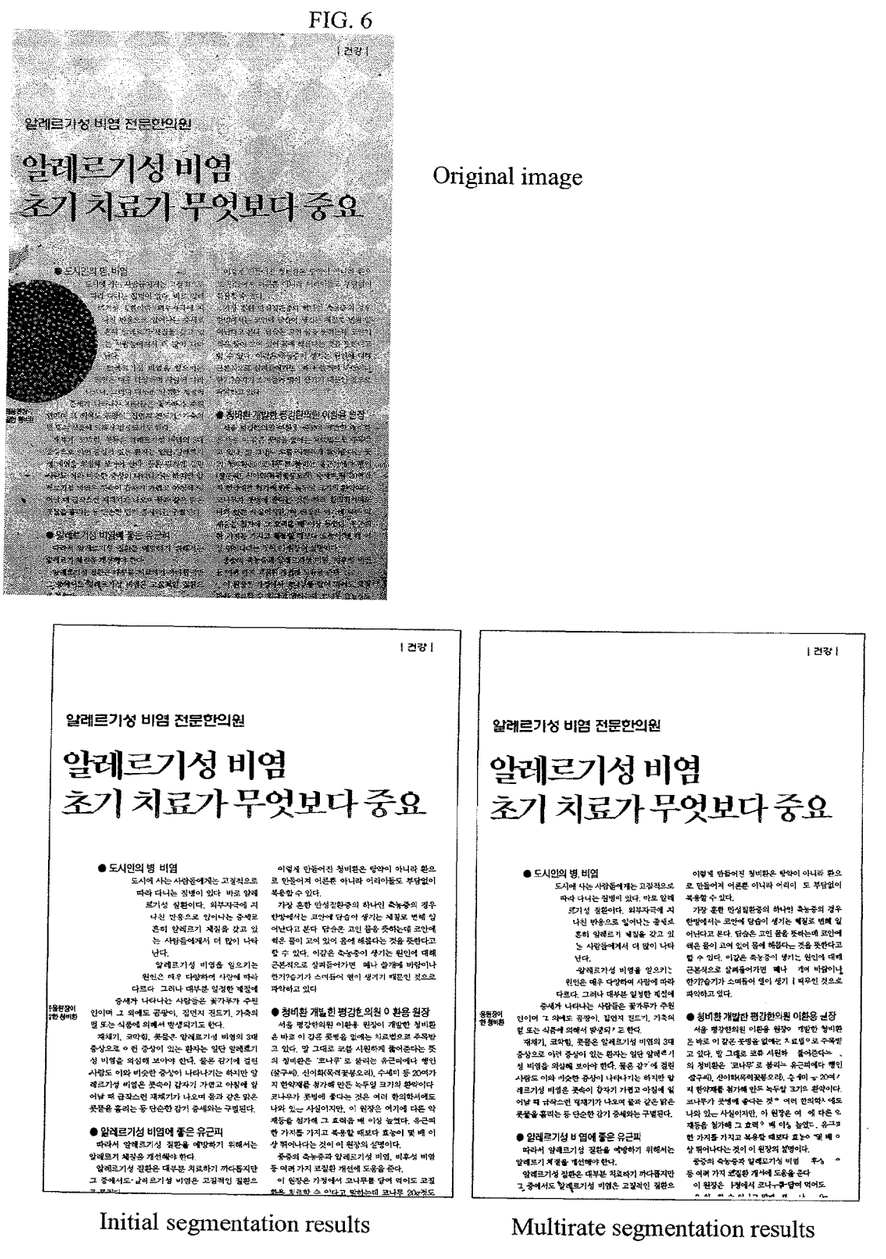
FIG. 6 is a view illustrating comparisons among an original image, an initial segmentation result, and multirate segmentation result obtained from the encoding apparatus of the image coding and/or decoding system of FIG. 1.

FIG. 6 is a view illustrating comparisons among an original image, an initial segmentation result, and multirate segmentation result obtained from the encoding apparatus of the image coding and/or decoding system of FIG. 1. FIG. 6 illustrates comparison between the initial segmentation result and the mutlrate segmentation result. For this sample image, the computation time of the multirate segmentation was 0.80 sec, and the computation time of the initial segmentation is 5.37 sec. In spite of the computation time reduction, the quality is still comparable to the original results.

The present general inventive concept can also be embodied as computer-readable codes on a computer-readable recording medium. The computer-readable recording medium is any data storage device that can store data as a program which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

As described above, the image coding and/or decoding system decreases a computation time taken to segment the input image and maintains quality of the segmentation image.

As described above, the image coding and/or decoding system provides refined edges of the segmentation image.

As described above, the image coding and/or decoding system can selectively use the sub-sampling according to the characteristic of the input image.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus usable in an image encoding and decoding system, comprising:
 a converting unit to convert a first image of a first resolution into a second image of a second resolution lower than the first resolution;
 a segmentation unit to divide the second image into blocks and segment the second image to generate a binary mask layer having a foreground and a background; and a refining unit to use the first image to convert the segmented second image into a segmented third image having a third resolution higher than the second resolution, wherein the third resolution is the same as the first resolution.

2. The apparatus of claim 1, wherein the refining unit further comprises an interpolating unit that interpolates the segmented second image using the first image, to output the segmented third image.

3. The apparatus of claim 1, wherein the refining unit refines an edge along boundaries of each connected component of the segmented second image using the first image and a boundary block between the foreground and the background using the first image, to generate the segmented third image.

4. The apparatus of claim 1, wherein:
the segmentation unit assigns the blocks of the second image to the foreground and the background; and
the refining unit converts the second resolution of the blocks into the third resolution, using the first image.

5. The apparatus of claim 4, wherein the blocks of the second image comprise pixels having the second resolution, and blocks of the third image comprises pixels having the third resolution.

6. The apparatus of claim 4, wherein the blocks of the second image comprise a first number of pixels representing the second resolution, and the blocks of the third image comprises a second number of pixels representing the third resolution.

7. The apparatus of claim 1, wherein:
the segmented second image comprises blocks of the binary mask layer having the foreground and the background; and
the refining unit refines edge blocks of the blocks of the segmented second image using the first image.

8. The apparatus of claim 1, wherein the converting unit is a sub-sampling and decimating unit to sub-sample and/or decimate the first image of the first resolution into the second image of the second resolution.

9. The apparatus of claim 1, wherein:
the converting unit is a sub-sampling unit to sub-sample the first image into the second image; and
the refining unit further comprises an interpolating unit to interpolate the segmented second image and the first image, to generate the segmented third image.

10. The apparatus of claim 1, wherein:
converting unit is a decimating unit to decimate the first image of the first resolution into the second image of the second resolution; and
the refining unit further comprises an interpolating unit to interpolate the segmented second image and the first image, to generate the segmented third image.

11. The apparatus of claim 1, wherein the converting unit is a sub-sampling unit to sub-sample and/or decimate the first image into the segmented second image.

12. The apparatus of claim 1, wherein:
the converting unit is a sub-sampling and decimating unit to reduce the first resolution of the first image to generate the second image of the second resolution; and
the refining unit further comprises an interpolating unit to increase the second resolution of the blocks of the segmented second image to generate the segmented third image.

13. The apparatus of claim 1, further comprising:
a scanner to scan a document to generate the first image as an input image signal.

14. The apparatus of claim 1, further comprising:
an encoding unit to encode the segmented image as an output image signal.

15. The apparatus of claim 14, further comprising:
a decoding unit to decode the output image signal as a print image signal.

16. The apparatus of claim 14, further comprising:
a printing unit to print the print image signal on a printing medium.

17. An apparatus usable in an image encoding and decoding system, comprising:
a converting unit to receive a first image having a first resolution and to generate a second image having a second resolution that is less than the first resolution;
a segmentation unit to divide the second image into blocks and segment the second image to generate a binary mask layer having a foreground and a background; and
a refining unit to generate a third image from the segmented second image by using the first image, the third image having a third resolution that is greater than the second resolution,
wherein the third resolution is the same as the first resolution.

18. An apparatus usable in an image encoding and decoding system, comprising:
a converting unit to convert a first image of a first resolution into a second image of a second resolution lower than the first resolution;
a segmenting unit to divide the second image into blocks and segment the second image to generate a binary mask layer having a foreground and a background;
a refining unit to use the first image to convert the segmented second image into a segmented third image of a third resolution higher than the second resolution;
an encoding unit to encode the segmented third image as an output image signal;
a decoding unit to decode the output image signal as a print image signal; and
a printing unit to print the print image signal on a printing medium,
wherein the third resolution is the same as the first resolution.

19. An image encoding and/or decoding system, comprising:
a converting unit to convert a first image having a first resolution into a second image having a second resolution that is lower than the first resolution;
a segmenting unit to segment the second image; and
a refining unit to use the first image to generate a segmented third image from the segmented second image, the segmented third image having a third resolution that is higher than the second resolution,
wherein the third resolution is the same as the first resolution.

20. A method of an image encoding and/or decoding system, the method comprising:
forming a second image by reducing a resolution of a first image;
segmenting the second image; and
using the first image to increase the resolution of the segmented second image to form a segmented third image,
wherein a resolution of the segmented third image is the same as the resolution of the first image.

21. A method of an image encoding and decoding system, the method comprising:
   converting a first image of a first resolution into a second image of a second resolution lower than the first resolution;
   segmenting the second image; and
   using the first image to increase the resolution of the segmented second image to form a segmented third image,
   wherein a resolution of the segmented third image is the same as the first resolution.

22. A method of an image encoding and decoding system, the method comprising:
   converting a first image of a first resolution into a second image of a second resolution lower than the first resolution;
   dividing the second image into blocks and segmenting the second image to generate a binary mask layer having a foreground and a background; and
   using the first image to convert the segmented second image into a segmented third image having a third resolution that is higher than the second resolution,
   wherein the third resolution is the same as the first resolution.

23. A method of an image encoding and decoding system, the method comprising:
   converting a first image of a first resolution into a second image of a second resolution lower than the first resolution;
   dividing the second image into blocks and segmenting the second image to generate a binary mask layer having a foreground and a background;
   using the first image to convert the segmented second image into a segmented third image having a third resolution higher than the second resolution;
   encoding the segmented third image as an output image signal;
   decoding the output image signal as a print image signal; and
   printing the print image signal on a printing medium,
   wherein the third resolution is the same as the first resolution.

24. A non-transitory computer readable recording medium containing computer readable codes as a program to execute a method of an image encoding and decoding system, the method comprising:
   converting a first image of a first resolution into a second image of a second resolution lower than the first resolution;
   segmenting the second image; and
   using the first image to convert the segmented second image into a segmented third image having a third resolution higher than the second resolution,
   wherein the third resolution is the same as the first resolution.

25. A non-transitory computer readable recording medium containing computer readable codes as a program to execute a method of an image encoding and decoding system, the method comprising:
   decreasing the resolution of a first image to form a second image;
   dividing the second image into blocks and segmenting the second image to generate a binary mask layer having a foreground and a background; and
   using the first image to increase the resolution of the segmented second image to form a segmented third image,
   wherein a resolution of the segmented third image is the same as the resolution of the first image.

26. A non-transitory computer readable recording medium containing computer readable codes as a program to execute a method of an image encoding and decoding system, the method comprising:
   converting a first image of a first resolution into a second image of a second resolution lower than the first resolution;
   dividing the second image into blocks and segmenting the second image to generate a binary mask layer having a foreground and a background;
   using the first image to convert the segmented second image into a third image;
   encoding the segmented third image as an output image signal;
   decoding the output image signal as a print image signal; and
   printing the print image signal on a printing medium,
   wherein a resolution of the segmented third image is the same as the first resolution.

* * * * *